United States Patent
Bikumandla

(10) Patent No.: US 8,729,451 B2
(45) Date of Patent: May 20, 2014

(54) MULTILEVEL RESET VOLTAGE FOR MULTI-CONVERSION GAIN IMAGE SENSOR

(75) Inventor: Manoj Bikumandla, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 358 days.

(21) Appl. No.: 13/221,736

(22) Filed: Aug. 30, 2011

(65) Prior Publication Data
US 2013/0048831 A1    Feb. 28, 2013

(51) Int. Cl.
H01J 40/14    (2006.01)
H03G 3/20    (2006.01)
H01L 27/00    (2006.01)
H04N 3/14    (2006.01)

(52) U.S. Cl.
USPC ............. 250/214 R; 250/214 AG; 250/208.1; 348/308; 348/309

(58) Field of Classification Search
CPC .............. H01J 40/14; H03G 3/20; H04N 3/14
USPC ............. 250/214 A, 214 LA, 214 R, 214 AG, 250/214 AL, 214 B, 214 C, 214 LS, 208.1; 348/300, 301, 307, 308, 309
See application file for complete search history.

(56) References Cited

U.S. PATENT DOCUMENTS

| | | | |
|---|---|---|---|
| 5,525,920 A * | 6/1996 | Rakers et al. | 327/65 |
| 7,075,049 B2 | 7/2006 | Rhodes et al. | |
| 7,728,896 B2 | 6/2010 | McKee | |
| 8,217,328 B2 * | 7/2012 | Yin et al. | 250/208.1 |
| 2006/0103749 A1 | 5/2006 | He | |
| 2009/0272879 A1 | 11/2009 | Dai | |

OTHER PUBLICATIONS

Li, Xiangli, "Mosfet Modulated Dual Conversion Gain CMOS Image Sensors", Doctoral Dlsertation, Boise State University, Nov. 2008, 176 pages.
Preview brochure for Feb. 23, 2011 Conference on Image Sensors, Session 23, pp. 60-61, prior to application filing date.
U.S. Appl. No. 12/972,188 entitled "Image Sensor Having Supplemental Capacitive Coupling Node", filed Dec. 17, 2010.

* cited by examiner

Primary Examiner — Georgia Y Epps
Assistant Examiner — Don Williams
(74) Attorney, Agent, or Firm — Blakely Sokoloff Taylor & Zafman LLP

(57) ABSTRACT

A method of operating an image sensor includes adjusting a capacitance coupled to a circuit node within a pixel cell. The circuit node is coupled to selectively receive an image charge acquired by a photo-sensor of the pixel cell. A conversion gain is selected from multiple conversion gains for the pixel cell by adjusting the capacitance. A voltage level from multiple voltage levels is selected for use as a reset signal when the reset signal is asserted. The reset signal controls resetting of the circuit node during operation of the pixel cell. The voltage level is selected dependent upon which of the multiple conversion gains is selected by adjusting the capacitance. The reset signal is asserted to reset a voltage at the circuit node.

19 Claims, 7 Drawing Sheets

MULTILEVEL RESET VOLTAGE FOR MULTI-CONVERSION GAIN IMAGE SENSOR

TECHNICAL FIELD

This disclosure relates generally to image sensors, and in particular, but not exclusively to complementary metal-oxide semiconductor ("CMOS") image sensors.

BACKGROUND INFORMATION

Image sensors have become ubiquitous. They are widely used in digital still cameras, cellular phones, security cameras, as well as, medical, automobile and other applications. The technology used to manufacture image sensors, and in particular complementary metal-oxide-semiconductor ("CMOS") image sensor, has continued to advance at great pace. For example, the demands of higher resolution and lower power consumption have encouraged the further miniaturization and integration of these image sensors.

FIG. 1A is a circuit diagram illustrating pixel circuitry of a four-transistor ("4T") pixel cell 100 within an image sensor array. Pixel cell 100 may be repeated and organized into rows and columns of the image sensor array. Pixel cell 100 includes a photodiode 101, a transfer transistor 102, a reset transistor 103, a source-follower ("SF") transistor 104, a row select ("RS") transistor 105, and a floating diffusion ("FD") node 106.

During operation, transfer transistor 102 receives a transfer signal TX, which causes transfer transistor 102 to transfer the charge accumulated in photodiode 101 to FD node 106. Reset transistor 103 is coupled between a power rail VDD and FD node 106 to reset the pixel cell (e.g., discharge or charge FD node 106 and photodiode 101 to a preset voltage) under the control of reset signal RST. Floating diffusion node 106 is coupled to the gate terminal of SF transistor 104. SF transistor 104 has its channel coupled between power rail VDD and RS transistor 105. SF transistor 104 operates as a source-follower, providing a high impedance connection to FD node 106. RS transistor 105 selectively couples the output of pixel cell 100 to bit line 107 (also referred to as a column readout line) under the control of signal RS.

FIG. 1B is a timing diagram 110 for pixel cell 100 in FIG. 1A during normal operation. In normal operation, photodiode 101 and FD node 106 are reset during a reset phase by temporarily asserting reset signal RST and transfer signal TX. As seen in FIG. 1B, after the reset phase, an integration phase is commenced by de-asserting transfer signal TX and reset signal RST, and permitting incident light to charge photodiode 101. The voltage or charge on photodiode 101 is indicative of the intensity of light incident of photodiode 101 during the integration period. The readout phase is commenced before the end of the integration phase, by asserting reset signal RST to reset FD node 106 to the reset voltage $V_{RST}$. $V_{RST}$ approximately equals the power rail VDD minus the threshold voltage $V_{TH}$ of reset transistor 103. After floating diffusion node 106 has been reset, row select signal RS and a sample signal SHR (sample-hold-reset) are asserted, which couples FD node 106 to a sample and hold circuit (not shown) via RS transistor 105 and bit line 107. After reset voltage $V_{RST}$ is sampled, sample signal SHR is de-asserted. The end of the integration phase occurs after the de-assertion of sample signal SHR. Transfer signal TX is then asserted to couple photodiode 101 to floating diffusion node 106 and the gate terminal of SF transistor 104. As the photo-generated charge carriers (e.g., electrons) accumulated on photodiode 101 are transferred to FD node 106, the voltage at FD node 106 decreases since electrons are negative charge carriers. After charge transfer is complete, transfer signal TX is de-asserted. After transfer signal TX is de-asserted, sample signal SHS (sample-hold-signal) is asserted and the voltage at FD node 106, $V_{SIG}$, is sampled.

When reset signal RST is asserted, during the reset phase and the beginning of the readout phase, the channel region of reset transistor 103 is inverted and electrons are injected into the channel. When reset signal RST is de-asserted, some charges in the channel will be injected to the terminal coupled to power rail VDD and other charges will be injected to the terminal coupled to FD node 106. The injection of charge into FD node 106 lowers the potential of FD node 106.

FIG. 1C is a graph illustrating the voltage at FD node 106 during the time periods illustrated in FIG. 1B. During the reset phase (and the beginning of the readout phase when reset voltage is sampled by a sample and hold circuit (not shown)), reset signal RST is asserted and FD node 106 is reset to reset voltage $V_{RST}$. As seen in FIG. 1C, when reset signal RST is de-asserted, the voltage at FD node 106 falls to a charge injection voltage $V_{CI}$. The difference between reset voltage $V_{RST}$ and charge injection voltage $V_{CI}$ is $\Delta V$. An increase in the voltage level of reset signal RST may result in an increase of $\Delta V$. The decrease in the potential of FD node 106 decreases the floating diffusion voltage swing and consequently decreases the conversion gain of pixel cell 100. Charge injection in the reset transistor can be reduced by increasing the channel length of the reset transistor; however, this either increases the size of pixel cell 100 or decreases the fill factor of pixel cell 100. The detrimental effects of charge injection can also be reduced by reducing clock speeds; however, this leads to a slower speed image sensor.

The conversion gain of pixel cell 100 is defined as the ratio of the change in voltage at FD node 106 during charge transfer to the change in charge transferred to FD node 106. Conversion gain is inversely proportional to the capacitance of FD node 106. A high conversion gain can be beneficial in improving low-light sensitivity. For traditional image sensors, conversion gain can be increased by reducing the capacitance of FD node 106; however, as pixel cells continue to shrink, pixel saturation or overexposure in bright environments is becoming more acute.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an apparatus and method of operation for pixel cells having an improved reset gate voltage for dual conversion gain ("DCG") are described herein. In the following description, numerous specific details are described to provide a thorough understanding of embodiments of the invention. One skilled in the relevant art will recognize, however, that the invention can be practiced without one or more of the specific details or with other methods, components, materials, etc. In other instances, well-known structures, materials or operations are not shown or described but are nonetheless encompassed within the scope of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. However, they are also not necessarily mutually exclusive.

Figure 2:
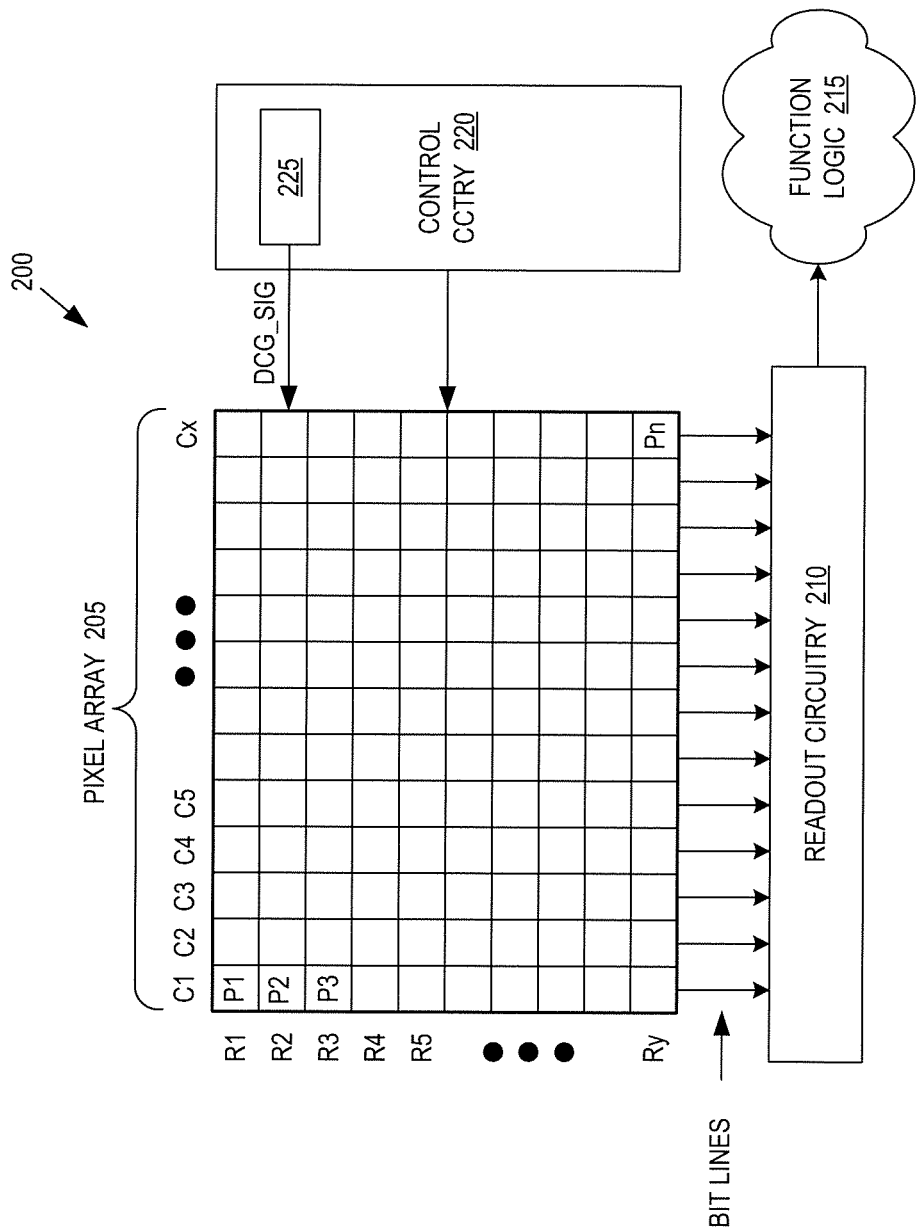
FIG. 2 is a functional block diagram illustrating an image sensor system, in accordance with an embodiment of the disclosure.

FIG. 2 is a block diagram illustrating image sensor system 200, in accordance with an embodiment of the disclosure. The illustrate embodiment of image sensor system 200 includes pixel array 205, readout circuitry 210, function logic 215, and control circuitry 220.

Pixel array 205 is a two-dimensional array of imaging sensor cells or pixel cells (e.g., pixels P1, P2, . . . , Pn). In one embodiment, each pixel is a complementary metal-oxide-semiconductor ("CMOS") imaging pixel. Pixel array 205 may be implemented as a frontside illuminated image sensor or a backside illuminated image sensor. As illustrated, each pixel is arranged in a row (e.g., rows R1 to Ry) and a column (e.g. C1 to Cx) to acquire image data of a person, place or object, which can then be used to render an image of the person, place or object.

After each pixel has acquired its image data or image charge, the image data is readout by readout circuitry 210 and then transferred to function logic 215. Readout circuitry 210 may include amplification circuitry, analog-to-digital ("ADC") circuitry, or otherwise. Function logic 215 may simply store the image data or even manipulate the image data by applying post-image effects (e.g., crop, rotate, remove red eye, adjust brightness, adjust contrast or otherwise). In one embodiment, readout circuitry 210 may readout a row of image data at a time along bit lines or may readout the image data using a variety of other techniques (not illustrated) such as a serial readout, column readout along readout row lines, a full parallel readout of all pixels simultaneously, or otherwise.

Control circuitry 220 is coupled to pixel array 205 and includes logic for controlling operational characteristics of pixel array 205. For example, reset, row select and transfer signals may be generated by control circuitry 220. Additionally, a dual conversion gain ("DCG") signal may also be generated by control circuitry 220. Control circuitry 220 includes logic for determining when the various control signals are to be asserted and de-asserted. In one embodiment, control circuitry includes photosensitive circuitry 225 used to measure the intensity or brightness of ambient light incident on pixel array 205 and adjust the control signals accordingly to provide a DCG feature that is adjusted based upon the ambient brightness.

Figure 3:
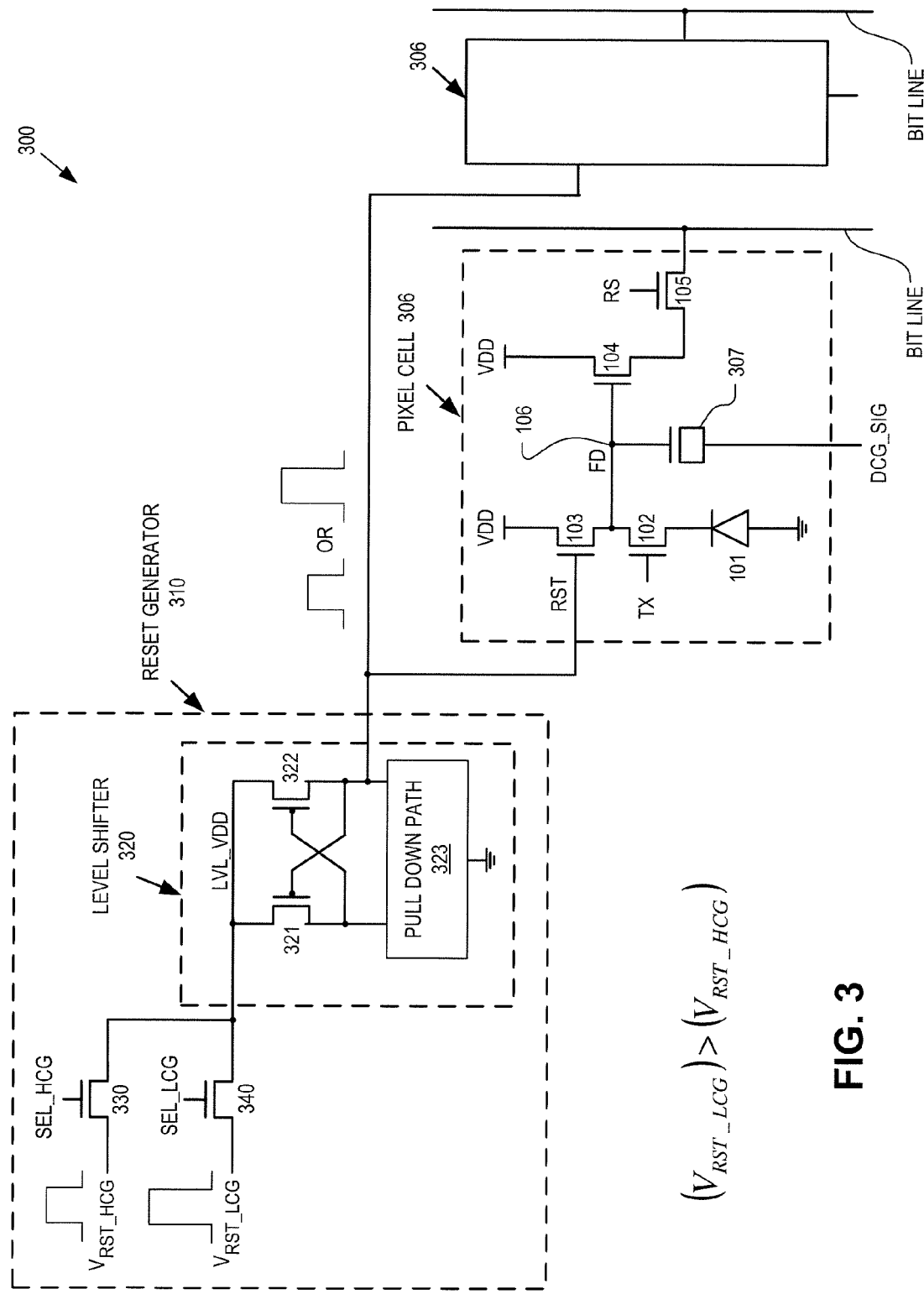
FIG. 3 is a circuit diagram illustrating circuitry for implementing dual conversion gain within an image sensor, in accordance with an embodiment of the disclosure.

FIG. 3 is a circuit diagram illustrating circuitry 300 for implementing a DCG function within image sensor system 200, in accordance to an embodiment of the invention. The illustrated embodiment of circuitry 300 includes pixel cells 306 (the internal components of just one pixel cell 306 is illustrated) and a reset generator 310. Pixel cell 306 represents one possible pixel circuitry architecture for implementing each pixel cell in pixel array 205 of FIG. 2. However, it should be appreciated that the teachings disclosed herein are not limited to 4T pixel architectures; rather, one of ordinary skill in the art having the benefit of the instant disclosure will understand that the present teachings may also be applicable to various other pixel architectures.

In the illustrated embodiment, reset generator 310 is shared by a row of pixel cells 306, with each row of pixel array 205 coupled to its own reset generator 310. In other embodiments, reset generator 310 may be shared by a column of pixel cells, by a group of pixel cells (e.g., all pixels having a common color), by all pixel cells within pixel array 205, or otherwise. Reset generator(s) 310 may be included within control circuitry 220 illustrated in FIG. 2.

Figure 1A:
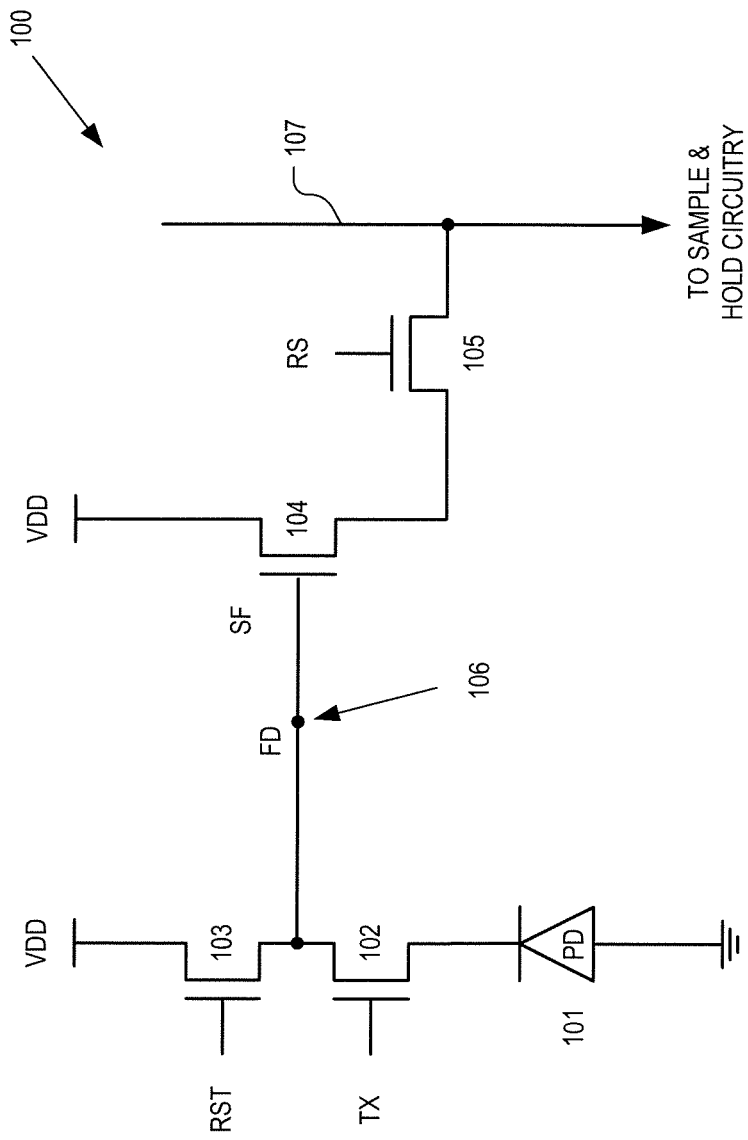
FIG. 1A (PRIOR ART) is a circuit diagram illustrating pixel circuitry of a four-transistor ("4T") pixel cell.
Figure 1B:
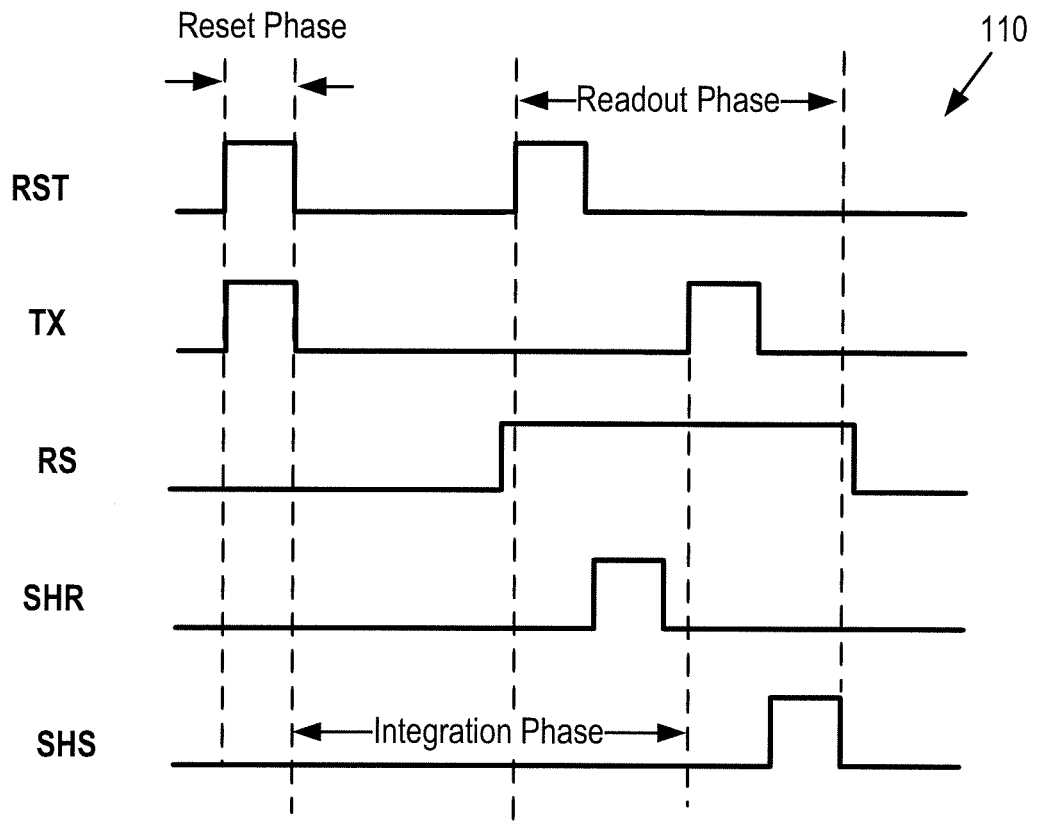
FIG. 1B (PRIOR ART) is a timing diagram illustrating control signals during operation of the pixel cell in FIG. 1A.
Figure 1C:
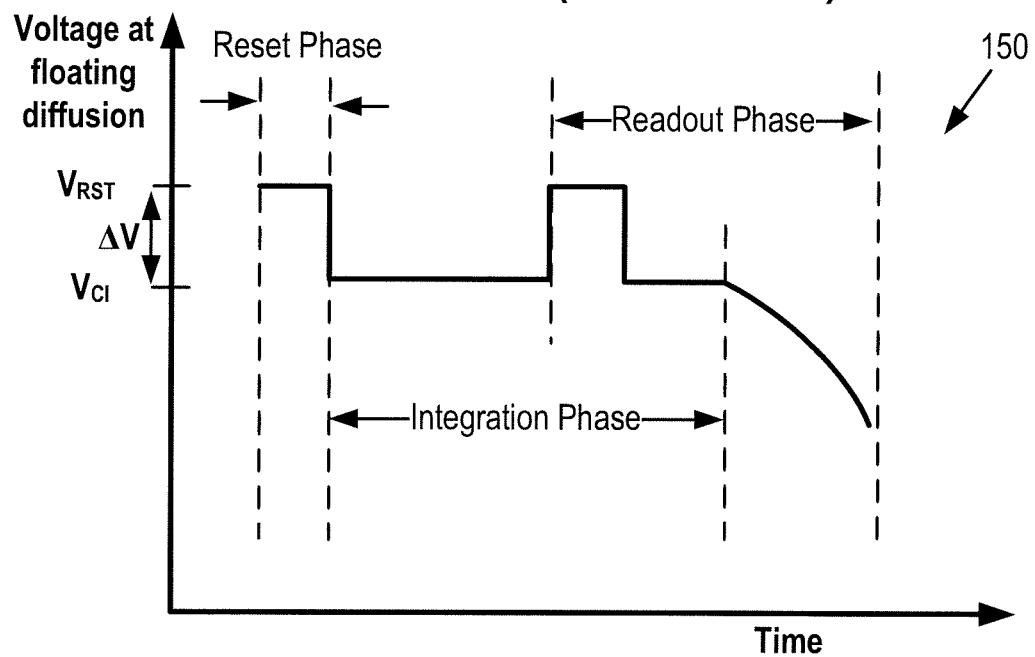
FIG. 1C (PRIOR ART) is a graph illustrating the voltage at the floating diffusion node during operation of the pixel cell illustrated in FIG. 1B.

The illustrated embodiment of pixel cell 306 includes similar components to pixel cell 100 in FIG. 1, but further includes an adjustable capacitance or transistor 307 coupled to floating diffusion node 106 to implement a dual conversion gain. In the present embodiment, transistor 307 has a gate terminal coupled to floating diffusion node 106 and source and drain terminals coupled together to receive a DCG signal (DCG_SIG). Thus, transistor 307 is configured as a MOS capacitor.

The illustrated embodiment of reset generator 310 includes a level shifter 320 and switches 330 and 340. Level shifter 320 includes cross-coupled transistors 321 and 322 and pull down path 323. Transistors 321 and 322 are coupled between level shift power supply LVL_VDD and pull down path 323. The gate and source terminals of transistors 321 and 322 are cross-coupled. Switches 330 and 340 selectively couple a high conversion gain reset power supply ($V_{RST\_HCG}$) and a low conversion gain reset power supply ($V_{RST\_LCG}$) through to the drain terminals of transistors 321 and 322 as LVL_VDD under the control of select signals SEL_HCG and SEL_LCG respectively.

An on-chip circuit (e.g., photosensitive circuitry 225) or off-chip circuit may be used to determine the intensity of light incident on photodiode 101, and associated logic used to determine whether or not a low conversion gain mode or a high conversion gain mode should be used to capture an image. This can be done in any number of ways. For example, a dedicated light-sensitive device (e.g., photosensitive circuitry 225) outside the imaging area of the image sensor can be used to monitor the amount of incident light onto the image sensor. Brightness thresholds may be programmed into the photosensitive circuitry for determining whether the ambient environment is determined to be bright or dim.

Figure 4:
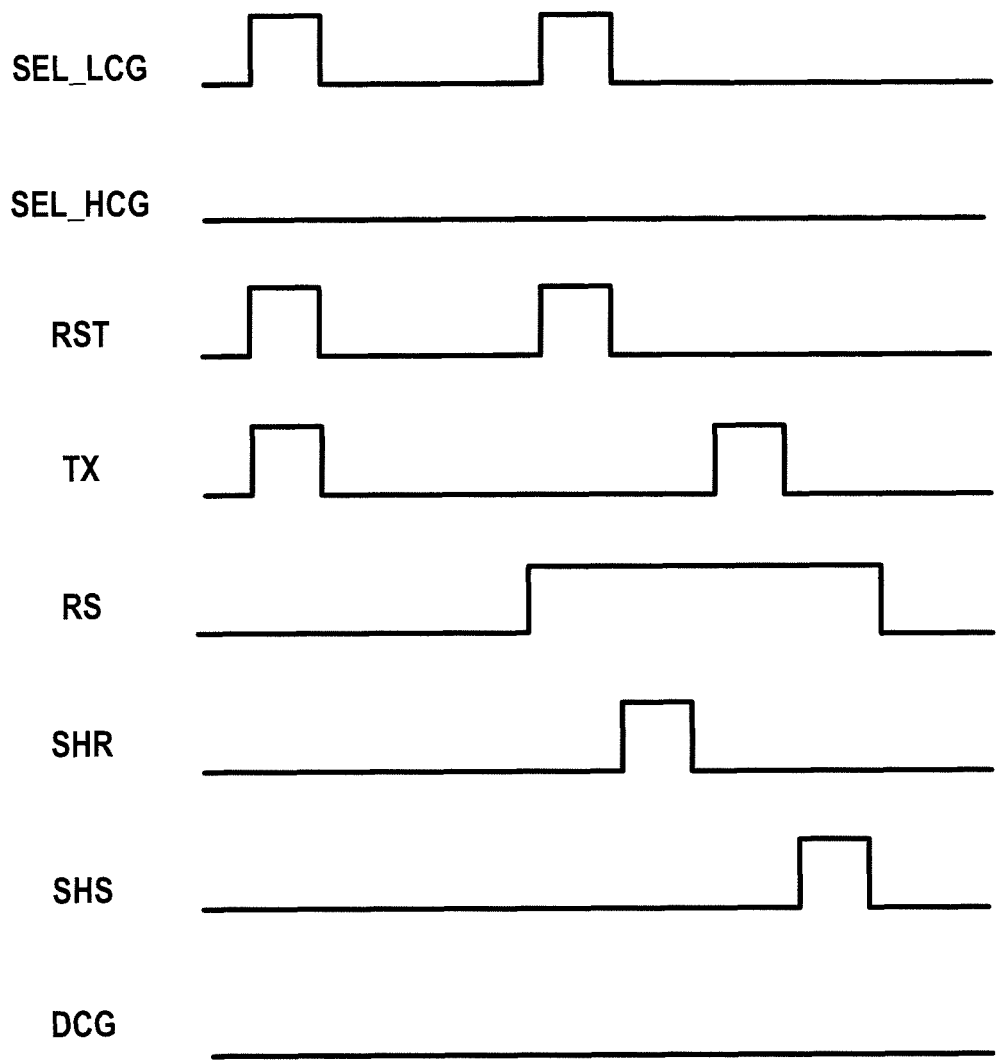
FIG. 4 is a timing diagram illustrating operation of an image sensor during low conversion gain operation for a bright ambient environment, in accordance with an embodiment of the disclosure.

In high light conditions (bright environment), a low conversion gain ("LCG") mode is used to achieve higher full well capacity and wider dynamic range. In LCG mode, DCG_SIG may be de-asserted by placing DCG_SIG in a low voltage setting (e.g., ground, logic low level, etc.), which is applied to the channel (e.g., both source and drain) of transistor 307, as seen in FIGS. 3 and 4. A de-asserted DCG_SIG places transistor 307 into an inversion mode and its inversion capacitance is added to floating diffusion node 106 to increase the totally capacitance of floating diffusion node 106, thereby decreasing the conversion gain of pixel cell 306. Transistor 307 may have a size selected such that the combined capacitance at FD node 106 while transistor 307 is operating in its inversion mode is 4 to 5 times greater than when transistor 307 is operating in its depletion mode.

When increasing the capacitance of FD node 106, the charge injection of reset transistor 103, as well as, the voltage level used to fully reset floating diffusion node 106 to reset voltage $V_{RST}$ is increased. This is achieved by enabling select signal SEL_LCG and coupling low conversion gain reset power supply $V_{RST\_LCG}$ to level shifter power supply LVL_VDD, thereby increasing the voltage level of reset signal RST. In one embodiment, select signal SEL_LCG is asserted at the same time as reset signal RST, at the beginning of the reset phase and the beginning of the readout phase, and de-asserted when reset signal RST is de-asserted.

Figure 5:
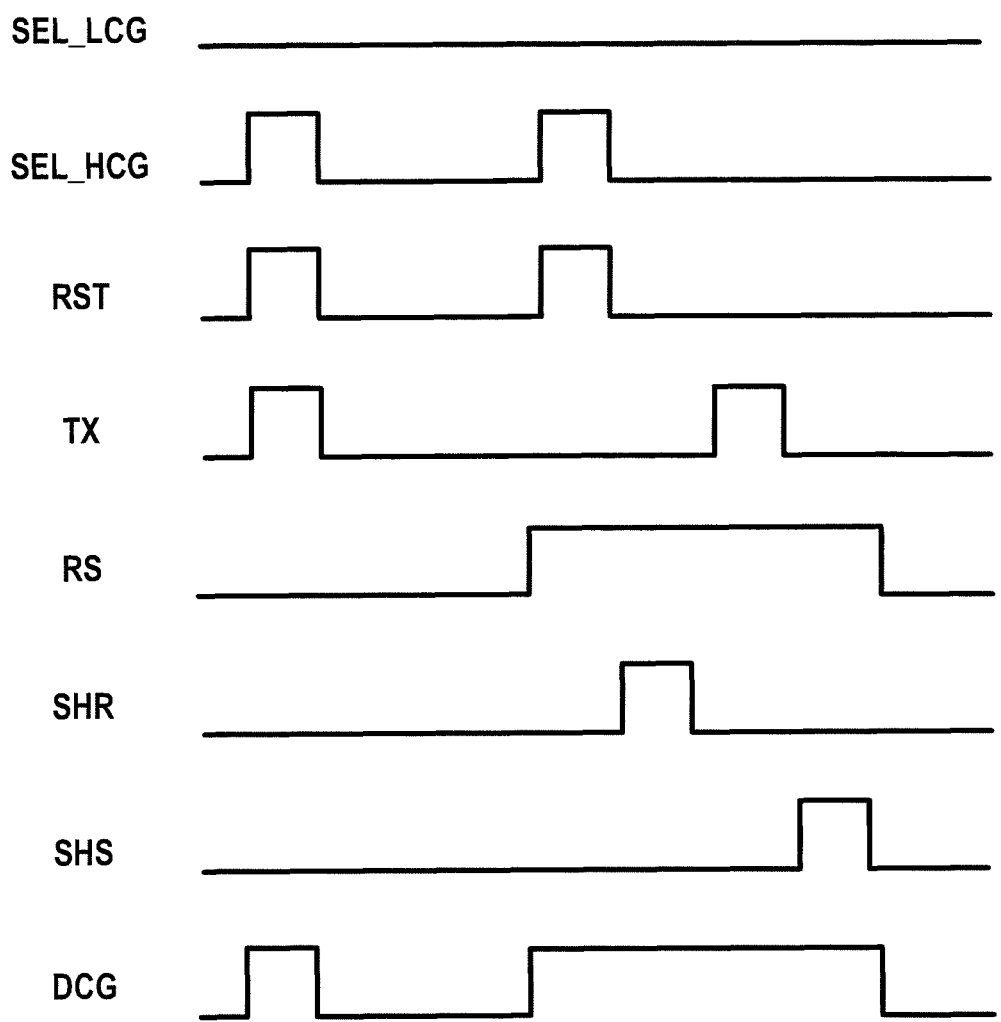
FIG. 5 is a timing diagram illustrating operation of an image sensor during high conversion gain operation for a dim ambient environment, in accordance with an embodiment of the disclosure.

In low light conditions (dim environment), a high conversion gain ("HCG") mode is used to improve low light sensitivity. The conversion gain of pixel cell 306 can be increased by asserting DCG_SIG (e.g., placing DCG_SIG equal to VDD, a logic high level, or otherwise), as seen in FIG. 5. By applying a high potential to the source and drain terminals of transistor 307, transistor 307 is placed in a depletion mode of operation. The capacitance of transistor 307 while operating in depletion mode is less than the capacitance of transistor 307 while in inversion mode, which is beneficial for low light conditions, since the conversion gain is increased.

The capacitance of floating diffusion node 106 in HCG mode is less than the capacitance in LCG mode, so comparatively the voltage level used to fully reset floating diffusion node 106 is lower in HCG mode than LCG mode. This is achieved by enabling select signal SEL_HCG and coupling high conversion gain reset power supply $V_{RST\_HCG}$ to level shifter power supply LVL_VDD via switch 330. The resultant voltage level of reset signal RST in LCG mode is lower than the voltage level of reset signal RST in HCG mode. Thus, the reset voltage applied to the gate of reset transistor 103 is adjusted dependent upon the selected capacitance at FD node 106. Compensating the reset voltage when adjusting the conversion gain capacitance improves the achievable voltage swing at FD node 106 thereby increasing the full well capacity and dynamic range of pixel cell 306.

The dual conversion gain feature disclosed herein provides for greater FD voltage swing and hence a greater dynamic range. When operating in low conversion gain mode, the greater reset voltage applied to the gate of reset transistor 103 increases the voltage across transfer transistor 102, which improves the charge transfer efficiency allowing for faster frame rates in video mode.

In FIGS. 4 and 5, signals SEL_LCG and SEL_HCG are asserted substantially contemporaneously with the reset signal RST. In other embodiments, select signal SEL_LCG or SEL_HCG, depending on the conversion gain desired, may be asserted before reset signal RST is asserted. In one embodiment, this early assertion simply accounts for signal propagation delays through reset generator 310 from switches 330 or 340 to the gate of reset transistor 103. In one embodiment, this early assertion may be used to pre-charge internal nodes of reset generator 310 and may include an additional switch isolating reset generator 310 from pixel cells 306. In the illustrated embodiment, reset transistor 103 is coupled to power rail VDD; however, in other embodiments, reset transistor 103 can be coupled to a power rail RST_VDD (e.g., 3.0V), which may have a higher voltage level than the logic level power rail VDD (e.g., 2.8V) coupled to other portions of the pixel circuitry.

In the illustrated embodiments, two different power supplies, $V_{RST\_LCG}$ and $V_{RST\_HCG}$ are used to obtain two distinct reset voltage levels for RST, with one reset signal having a voltage level that is higher than the other. However, a multi-conversion gain image sensor is contemplated herein wherein three or more distinct power supply voltages may be used, to provide three or more reset voltage levels for differing conversion gains. In the illustrated embodiment, transistor 307 is configured as a single MOS capacitor coupled to one DCG signal to provide an adjustable capacitance to FD node 106. In other embodiments, multiple MOS capacitors may be coupled in parallel to FD node 106 and multiple DCG signals may be used to control the adjustable capacitances coupled to FD node 106. Other adjustable capacitance structures may be used as well (e.g., switchable connected metal-to-metal capacitors).

In the present embodiments, a low conversion gain is used for high light conditions (bright environment) and a high conversion gain is used for low light conditions (dim environment). In other embodiments, two (or more) images of the same scene can be taken in rapid succession, or simultaneously, each using different conversion gains, and the two images combined into a composite image using on-chip or off-chip circuitry to obtain an image with a higher dynamic range. The composite image may be generated by using the low conversion gain image for bright regions in the scene while using the high conversion gain image for dim regions in the scene. For example, the user may selecting a high dynamic range setting for the image sensor, and thereafter the image sensor would automatically acquire the two images of a given scene in rapid succession with the image sensor configured in the low and high conversion gain modes.

In one embodiment, the threshold voltage of the transistors shown in FIG. 3 is 0.3V, $V_{RST\_LCG}$ is 3.6V, $V_{RST\_HCG}$ is 3.3V, RST_VDD is 3.0V, and VDD is 2.8V. Of course, other voltage level combinations may be used.

Figure 6:
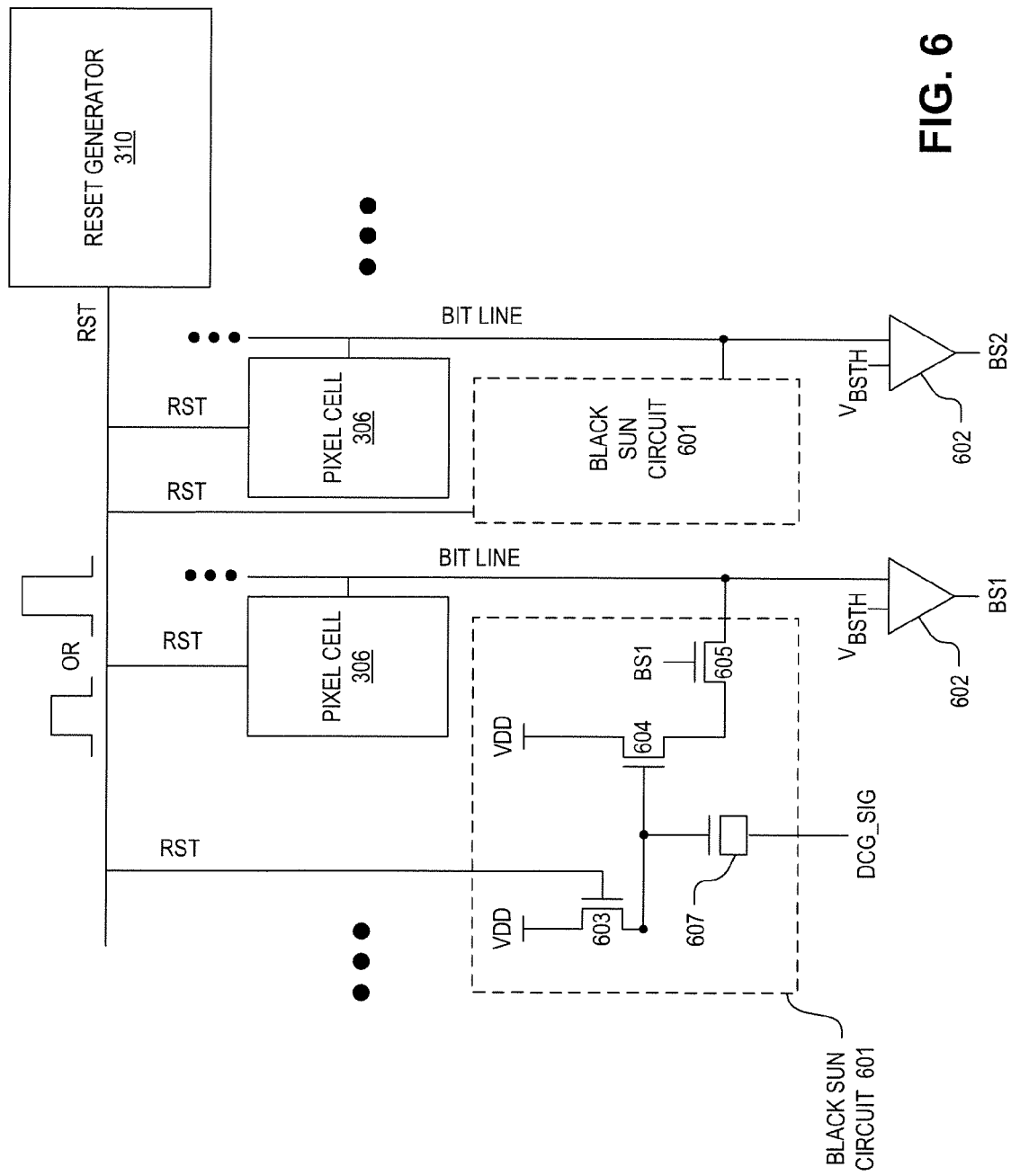
FIG. 6 is a block diagram illustrating a black sun circuit coupled to each bit line of a pixel array, in accordance with an embodiment of the disclosure.

FIG. 6 is a block diagram illustrating a black sun circuit 601 coupled to each bit line of a pixel array, in accordance with an embodiment of the disclosure. The illustrated embodiment of black sun circuit 601 includes a reset transistor 603, a source follower transistor 604, a bit line select transistor 605, and an adjustable capacitance 607 (e.g., MOS capacitor).

In the illustrated embodiment, each bit line couples to a column of pixel cells 306 for reading out the image data, in the form of an image voltage, to readout circuitry 210. Each bit line is further coupled to a comparator 602 that compares the image voltage to a black sun threshold voltage ($V_{BSTH}$). If the voltage on the corresponding bit line passes $V_{BSTH}$, then comparator 602 triggers operation of it corresponding black sun circuit 601 by enabling bit line select transistor 605 via the bit line select control signal (e.g., BS1, BS2, etc.).

Black sun circuits 601 operate to reduce or eliminate black spots that occur in bright portions of images due to oversaturation of a given pixel and the resultant voltage breakdown at the FD node 106. Comparators 602 operate by a threshold comparison to detect these black sun spots in the image. Once a black sun spot is determined to exist, the voltage on the corresponding bit line is reset to a default value by black sun circuit 601. Since pixel cells 306 are dual conversion gain (or even multi-conversion gain) pixels cells, black sun circuits 601 reset the bit lines to a selectable voltage dependent upon the currently selected conversion gain mode of pixel cells 306. To do so, each black sun circuit 601 includes a similar structure to pixel cells 306, but omits the photo-sensor and the transfer transistor. Thus, black sun circuits 601 are coupled to receive the multi-level reset signal RST from reset generator 310 and the dual conversion gain signal DCG_SIG that is also coupled into pixel cells 306. Although FIG. 6 illustrates black sun circuits 601 as being a dual conversion gain circuit, it should be appreciated that other embodiments may use more than two voltage levels for the RST signal and DCG_SIG to implement a multi-conversion gain image sensor.

The processes/operations explained above may be described in terms of computer software and hardware. The techniques described may constitute machine-executable instructions embodied within a tangible machine (e.g., computer, image sensor) readable storage medium, that when executed by a machine will cause the machine to perform the operations described. Additionally, the processes/operations may be embodied within hardware, such as an application specific integrated circuit ("ASIC") or the like.

A tangible machine-readable storage medium includes any mechanism that provides (i.e., stores) information in a form accessible by a machine (e.g., a computer, network device, personal digital assistant, manufacturing tool, image sensor, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of operating an image sensor, the method comprising:
adjusting a capacitance coupled to a circuit node within a pixel cell, wherein the circuit node is coupled to selectively receive an image charge acquired by a photo-sensor of the pixel cell, wherein a conversion gain is selected from multiple conversion gains for the pixel cell by adjusting the capacitance;
selecting a voltage level from multiple voltage levels for use as a reset signal when the reset signal is asserted, wherein the reset signal controls resetting of the circuit node during operation of the pixel cell and is applied to a gate terminal of a reset transistor, wherein the voltage level is selected dependent upon which of the multiple conversion gains is selected by adjusting the capacitance;
asserting the reset signal to reset a voltage at the circuit node;
acquiring an image charge at the photo-sensor;
transferring the image charge to the circuit node thereby changing the voltage at the circuit node; and
reading out image data indicative of the voltage at the circuit node.

2. The method of claim 1, wherein the circuit node comprises a floating diffusion ("FD") node.

3. The method of claim 1, wherein adjusting the capacitance coupled to the circuit node comprises:
asserting a conversion gain signal coupled to a channel of a conversion gain transistor, wherein a gate of the conversion gain transistor is coupled to the circuit node.

4. The method of claim 3, wherein a source and a drain of the channel of the conversion gain transistor are coupled together to both receive the conversion gain signal.

5. The method of claim 3, wherein asserting the conversion gain signal comprises:
setting the conversion gain signal to a high voltage level when configuring the pixel cell into a low conversion gain mode; and
setting the conversion gain signal to a low voltage level when configuring the pixel cell into a high conversion gain mode.

6. The method of claim 1, wherein the reset signal is coupled to a gate terminal of a reset transistor having a channel coupled between a high voltage rail and the circuit node.

7. The method of claim 6, wherein selecting the voltage level from multiple voltage levels for use as the reset signal when the reset signal is asserted comprises:
selecting the voltage level to be a first voltage level when configuring the pixel cell into a low conversion gain mode; or
selecting the voltage level to be a second voltage level when configuring the pixel cell into a high conversion gain mode, wherein first voltage level is greater than the second voltage level.

8. The method of claim 7, wherein the first and second voltage levels are greater than the high voltage rail to which the channel of the reset transistor is coupled.

9. The method of claim 7, wherein transferring the image charge to the circuit node comprises:
asserting a transfer signal coupled to a gate of a transfer transistor coupled between the circuit node and the photo-sensor,
wherein selecting the voltage level from multiple voltage levels is executed simultaneously with or prior to each assertion of the reset signal.

10. The method of claim 7, further comprising:
monitoring an ambient environment of the image sensor in real-time during operation of the image sensor;
selecting the low conversion gain mode when the ambient environment is deemed to be bright; and
selecting the high conversion gain mode when the ambient environment is deemed to be dim.

11. The method of claim 1, further comprising:
configuring the image sensor into a first one of low or high conversion gain modes;
acquiring a first image of a scene while the image sensor is in the first one of the low or high conversion gain modes;
automatically configuring the image sensor into a second one of the low or high conversion gain modes;
automatically acquiring a second image of the scene while the image sensor is in the second one of the low or high conversion gain modes; and
combining the first and second images into a composite image having a greater dynamic range than either of the first or second images individually.

12. The method of claim 1, further comprising:
outputting the image data as an image voltage on a bit line coupled to the pixel cell;
comparing the image voltage to a black sun threshold voltage using a black sun circuit coupled to the bit line; and
selectively resetting the bit line to a reset value based upon the comparing, wherein the black sun circuit includes:
a reset transistor having a gate terminal coupled to receive the reset signal; and
an adjustable capacitance that changes when the capacitance coupled to the circuit node within the pixel cell is adjusted.

13. An image sensor system comprising:
a pixel array including a given pixel cell, the given pixel cell including:
a photo-sensor to capture an image charge;
a floating diffusion ("FD") node coupled to receive the image charge from the photo-sensor;
an adjustable capacitance coupled to the FD node to change a conversion gain of the given pixel cell in response to a conversion gain signal; and
a reset transistor coupled to reset a voltage at the FD node in response to a reset signal applied to a gate terminal of the reset transistor; and
a control unit coupled to the pixel array, the control unit including logic that when executed by the control unit causes the control unit to perform operations including:
setting the conversion gain signal to change the adjustable capacitance;
selecting a voltage level from multiple voltage levels for the reset signal when the reset signal is asserted to reset the FD node, wherein the voltage level is selected dependent upon the value selected for the adjustable capacitance; and
asserting the reset signal to reset the FD node.

14. The image sensor system of claim 13, wherein setting the conversion gain signal comprises:
setting the conversion gain signal to a high voltage level when configuring the given pixel cell into a low conversion gain mode; and
setting the conversion gain signal to a low voltage level when configuring the given pixel cell into a high conversion gain mode.

15. The image sensor system of claim 13, wherein the reset transistor includes a channel coupled between a high voltage rail and the FD node.

16. The image sensor system of claim 15, wherein selecting the voltage level for the reset signal when the reset signal is asserted comprises:
selecting the voltage level to be a first voltage level when configuring the given pixel cell into a low conversion gain mode; or
selecting the voltage level to be a second voltage level when configuring the given pixel cell into a high conversion gain mode, wherein first voltage level is greater than the second voltage level.

17. The image sensor system of claim 16, wherein the first and second voltage levels are greater than the high voltage rail to which the channel of the reset transistor is coupled.

18. The image sensor system of claim 17, wherein selecting the voltage level from multiple voltage levels is executed simultaneously with or prior to each assertion of the reset signal.

19. The image sensor system of claim 13, further comprising:
a bit line coupled to the given pixel cell for outputting an image voltage from the given pixel cell;
a comparator coupled to the bit line to compare the image voltage to a black sun threshold voltage; and
a black sun circuit coupled to the bit line and responsive to an output of the comparator to reset the bit line, the black sun circuit including:
another reset transistor having a gate terminal coupled to receive the reset signal; and
another adjustable capacitance that changes in response to the conversion gain signal.

* * * * *